(12) United States Patent
Coffey et al.

(10) Patent No.: US 8,237,578 B2
(45) Date of Patent: *Aug. 7, 2012

(54) FUSE AND BREAKER ALARM DEVICE AND METHOD USING A FINITE STATE MACHINE

(75) Inventors: Joseph C. Coffey, Burnsville, MN (US); Brad Blichfeldt, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,157

(22) Filed: Dec. 14, 2009

(65) Prior Publication Data

US 2010/0090848 A1    Apr. 15, 2010

Related U.S. Application Data

(63) Continuation of application No. 11/602,478, filed on Nov. 20, 2006, now Pat. No. 7,633,400.

(51) Int. Cl.
 *G08B 21/00*      (2006.01)
(52) U.S. Cl. ............................ 340/638; 326/39; 361/626
(58) Field of Classification Search .................. 340/638, 340/639; 326/38, 39; 361/626, 642, 656
See application file for complete search history.

(56) References Cited

U.S. PATENT DOCUMENTS

| 4,742,252 | A | 5/1988 | Agrawal |
| 4,963,768 | A | 10/1990 | Agrawal et al. |
| 5,233,330 | A | 8/1993 | Hase |
| 5,621,650 | A | 4/1997 | Agrawal et al. |
| 6,201,675 | B1 | 3/2001 | Ballinger |
| 6,456,203 | B1 | 9/2002 | Schomaker et al. |
| 7,054,122 | B2 | 5/2006 | Chen et al. |
| 7,330,343 | B2 | 2/2008 | Chen |
| 7,633,400 | B2 * | 12/2009 | Coffey et al. ................. 340/638 |
| 2004/0036480 | A1 | 2/2004 | Lin |
| 2006/0087785 | A1 | 4/2006 | Bender et al. |
| 2008/0030318 | A1 | 2/2008 | Roark et al. |
| 2008/0255782 | A1 | 10/2008 | Bilac et al. |

FOREIGN PATENT DOCUMENTS

FR    2 309 121    11/1976

OTHER PUBLICATIONS

International Search Report and Written Opinion mailed Dec. 19, 2008.

* cited by examiner

*Primary Examiner* — John A Tweel, Jr.
(74) *Attorney, Agent, or Firm* — Merchant & Gould P.C.

(57) ABSTRACT

An alarm circuit and method of monitoring a circuit protection device are disclosed. The alarm circuit includes a circuit protection device connected in series at an input voltage of a load. The alarm circuit also includes a programmable circuit connected in parallel to the circuit protection device and including an alarm signal. The programmable circuit is programmed to include a plurality of functional states, and at least one functional state corresponds to activation of the alarm signal. The at least one functional state activating the alarm signal corresponds with an interruption condition in the circuit protection device.

22 Claims, 9 Drawing Sheets

US 8,237,578 B2

FUSE AND BREAKER ALARM DEVICE AND METHOD USING A FINITE STATE MACHINE

CROSS REFERENCE TO RELATED APPLICATION

This application is a continuation of application Ser. No. 11/602,478, filed Nov. 20, 2006, now U.S. Pat. No. 7,633,400, issued Dec. 15, 2009, which application is incorporated herein by reference in its entirety.

TECHNICAL FIELD

The present disclosure relates to detection and alarming in circuits using circuit protection devices. More particularly, the present disclosure relates to use of a finite state machine to detect conditions of circuit protection devices.

BACKGROUND

Direct current (DC) electrical circuits generally provide a source of current to downstream devices operating at a specific voltage. The current that is provided to the downstream devices generally falls within an acceptable range which corresponds to the expected load resistance of the devices. Due to variations in the activity or possible failure of one or more of the downstream devices, the load resistance may vary. Variations in the load, or variations in a voltage or current source attached to the load, causing an unexpectedly high current level can cause device failure if the current drawn by the circuit exceeds a threshold amount.

Alarm circuits are commonly used to protect load devices from electrical currents above the rated threshold of the particular load. Circuit protection devices and alarm triggering mechanisms are commonly used in such alarm circuits. The circuit protection devices, such as fuses or circuit breakers, are generally located at an "upstream" location in series with the load, such that an interruption caused by the circuit protection device disrupts the current path through the load circuit. The alarm triggers generate an alarm signal when the circuit protection device interrupts the circuit to indicate the occurrence of such an interruption.

FIGS. 1A-1C illustrate operation of a prior art alarm circuit using a secondary alarming fuse which can be used in a direct current circuit. FIG. 1A shows normal operation of the alarm circuit in which current passes through the primary circuit protection device, shown as the main fuse 10. FIG. 1B shows the current path when the main fuse 10 blows, and indicates that the current shifts to pass through the secondary fuse placed in parallel with the main fuse 10, shown as GMT fuse 12. Because the GMT fuse 12 is selected to have a lower current rating than the main fuse 10, it also soon blows, enabling the alarm signal 14 as shown in FIG. 1C. This configuration has a cost disadvantage, because each time the primary fuse 10 blows, both it and the secondary alarming fuse must be replaced, adding to the maintenance cost of the circuit. Further, additional user-accessible space is required for two fuses. The secondary fuse also creates a potential electrical hazard because the full input voltage is present at the output terminals of the circuit. Also, unprotected GMT fuses potentially eject the metallic fuse portion of the blown fuse from the fuse holder when blown, creating a fire or injury hazard.

FIGS. 2A-2B illustrate operation of a prior art alarm circuit using a monitoring circuit. FIG. 2A shows normal operation of the alarm circuit, in which a monitoring circuit 16 connects in parallel to the main fuse 10. The current passes through the main fuse 10 and load 20. FIG. 2B shows operation of the alarm circuit after the main fuse 10 blows. The current passes through the monitoring circuit 16 and load 20. Therefore, even when the main fuse 10 blows, a current path exists through the monitoring circuit 16 and a voltage appears at the output terminals. Therefore, it can be difficult for monitoring personnel to detect the location or existence of the fault.

FIG. 2C illustrates operation of an alarm circuit where two power feeds are connected to a load equipped with OR-ing diodes for power redundancy. In such a configuration, when a main fuse 10 blows, leakage current flows though the OR-ing diode which in turn prevents the monitoring circuit from detecting the status of the main fuse. As a result, no fuse alarm signal is generated and the load is no longer protected with dual power feeds. In addition, the leakage current creates a potential across the power input terminals of the load preventing on-board voltage sensors from detecting a fault condition. This can result in a catastrophic system failure because there is no warning of a fault condition.

Therefore, improvements are desirable.

SUMMARY

The embodiments of the present disclosure provide an alarm circuit using a programmable circuit. The alarm circuit has a circuit protection device connected in series at an input voltage of a load, and the programmable circuit is connected in parallel to the circuit protection device. The programmable circuit includes a plurality of functional states and controls an alarm signal. At least one of the functional states corresponds to activation of the alarm signal. Activation of the alarm signal corresponds to an interrupt condition in the circuit protection device.

In another aspect, a method of monitoring a circuit protection device is disclosed. The method includes connecting a programmable circuit in parallel to the circuit protection device. The programmable circuit is programmed to include a plurality of functional states, and at least one functional state corresponds to activation of the alarm signal. The method also includes detecting the absence of a circuit protection device. The method further includes detecting the presence of the circuit protection device. The method also includes detecting a failure in the circuit protection device. The method includes, upon detection of a failure in the circuit protection device, entering the at least one functional state, thereby enabling an alarm signal.

The programmable circuit can be clocked or unclocked, and can control an indicator and a pull down circuit. The indicator visually displays the status of the circuit protection device. The pull down circuit ensures that there is less than 1 VDC of voltage difference across the load of the general DC circuit when the circuit protection device has interrupted the circuit. The programmable circuit can be implemented in a circuit panel, such as a power distribution panel.

DETAILED DESCRIPTION

The present disclosure relates to use of a finite state machine to control alarm states in an alarm circuit for a direct current circuit. The alarm circuit includes a circuit protection device, such as a fuse or circuit breaker, placed in series with a load element. The load element is the device or port to which direct current electricity is intended to be delivered.

Figure 3:
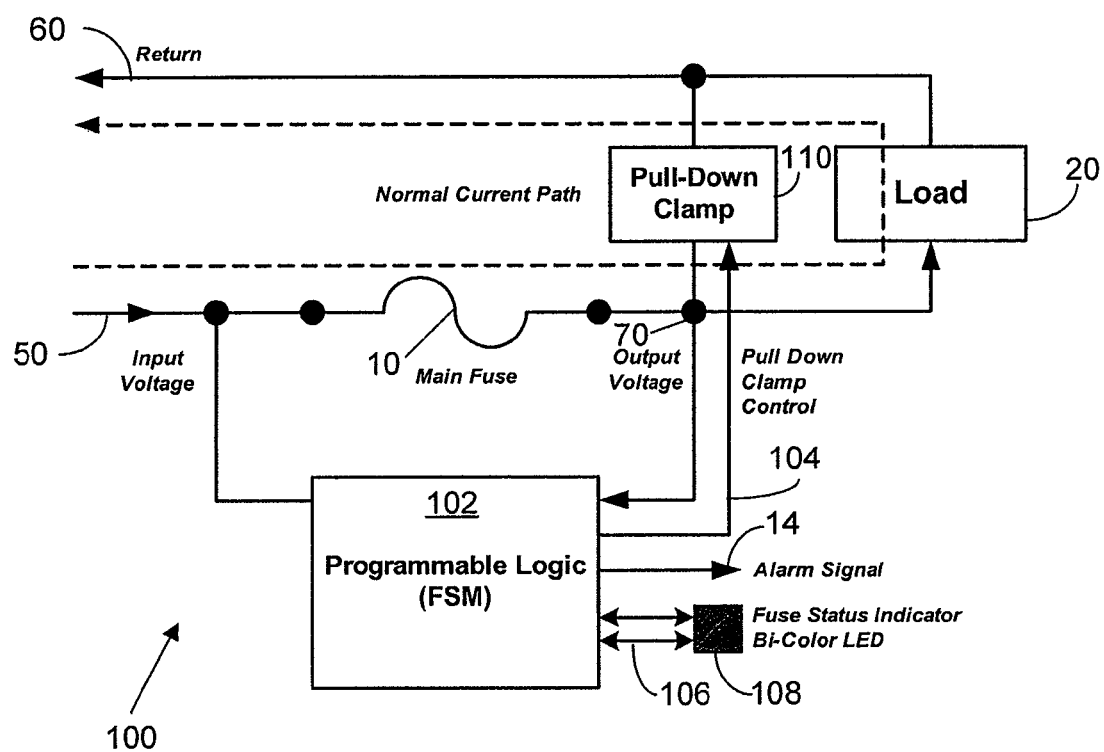
FIG. 3 is a schematic diagram of an alarm circuit incorporating a programmable circuit according to a possible embodiment of the present disclosure.
Figure 4:
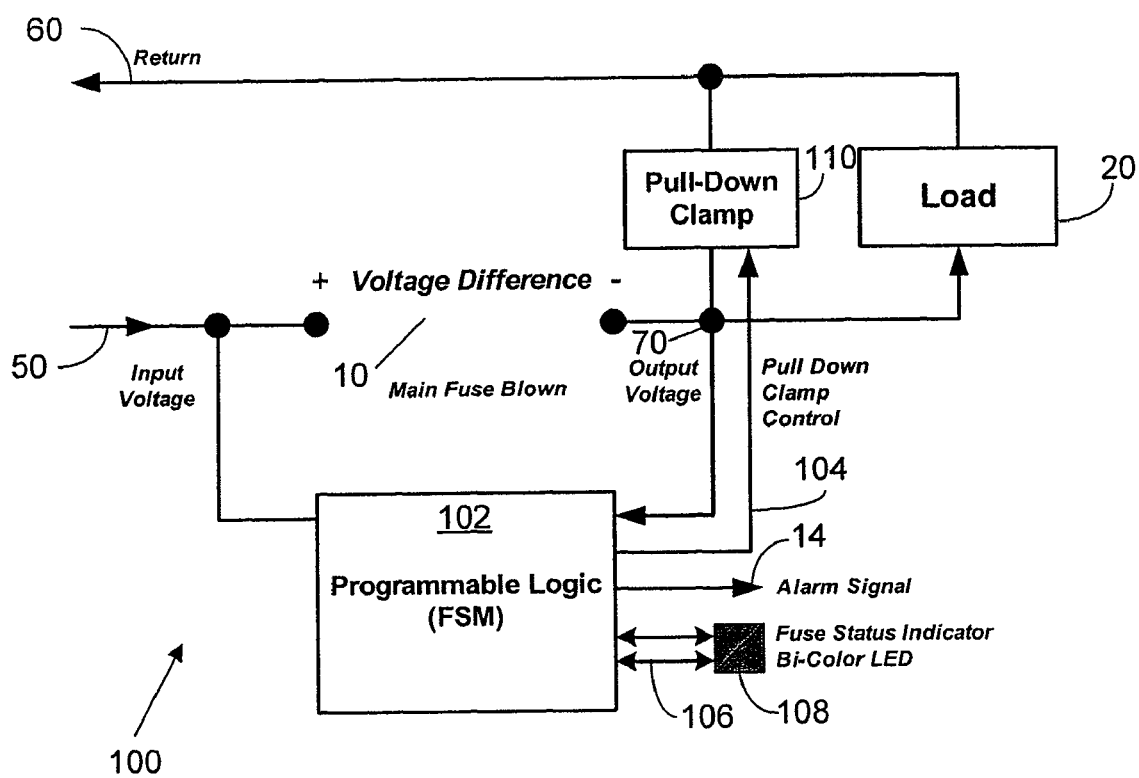
FIG. 4 is a schematic diagram of an interrupted alarm circuit incorporating a programmable circuit according to a possible embodiment of the present disclosure.

Referring now to FIGS. 3-4, a schematic diagram of an alarm circuit 100 added to a direct current circuit is shown in both normal operation and interrupted states. The generalized direct current circuit includes an input voltage 50, a return 60, and a load 20. During standard operation of the direct current circuit, a current path passes from the input voltage 50 through the load 20 and back through the return 60. A direct current power source connects across the input voltage 50 and the return 60 to power the circuit. The load 20 can be any electrical device requiring direct current for operation, or can be a connection to a circuit requiring direct current.

The alarm circuit 100 includes a circuit protection device, shown as main fuse 10, and a programmable circuit 102. The main fuse 10 electrically connects between the input voltage 50 and the load 20 to protect the load from excess current, as shown in FIG. 3. The main fuse 10 has a threshold current rating, above which the fuse 10 will blow, causing a discontinuity in the current path as seen in FIG. 4. In an alternate embodiment, a circuit breaker or other circuit protection device substitutes for the main fuse 10.

Alarm circuit 100 can be used in a variety of devices, including power distribution panels which house power outputs and inputs, and the circuitry for circuit protection. For example, the alarm circuit 100 can be implemented in a multiple port panel component in which six main fuses 10 are protected by six alarm circuits 100. U.S. Pat. No. 6,456,203 shows one example of a panel construction for the alarm circuit 100 of the present invention. U.S. Pat. No. 6,456,203 is hereby incorporated by reference.

Various implementations of the programmable circuit 102 can be used in conjunction with a panel such as the one disclosed in U.S. Pat. No. 6,456,203. In one embodiment using such a panel, the programmable circuit 102 resides within circuitry mounted on a single fuse module. In another embodiment, multiple programmable circuits 102 reside on an alarm circuit module separate from one or more fuse modules, and which can be selectively added or removed from the panel. In a further embodiment, multiple programmable circuits 102 reside within circuitry incorporated within the panel itself, and monitor multiple fuses 10 modularly added or removed from the panel.

The programmable circuit 102 includes a number of input and output connections. Inputs to the programmable circuit 102 include the input voltage 50 and output voltage 70, across which the programmable circuit is connected in parallel with the circuit protection device. The programmable circuit 102 connects to the input voltage 50 and output voltage 70 via a comparator (not shown) which outputs logic based voltage differences between the input voltage 50 and output voltage 70 which indicate the state of the fuse 10 or other circuit protection device. A difference between the input voltage and the output voltage above a given threshold indicates the presence of a good fuse, and outputs a logic level "1" to the programmable circuit 102. A difference between the input voltage 50 and the output voltage 70 below the given threshold indicates the absence of a fuse or presence of a blown fuse, and results in a logic level "0" provided to the programmable circuit 102.

In a possible embodiment, the programmable circuit 102 includes an input configured to receive a clock signal, such as a signal generated by an oscillator (not shown). In such an embodiment, the programmable circuit 102 operates at frequencies up to and exceeding 10 Hz. An alternate embodiment of the programmable circuit 102 is unclocked, and changes state based on input values to the programmable circuit.

Outputs from the programmable circuit 102 include an alarm signal 14, a pull down clamp control signal 104, and indicator control signals 106. Additional control outputs optionally control further aspects of the alarm circuit 100 or generate additional alarm notifications. The alarm signal 14 outputs an alarm indication signal upon programmable circuit 102 detecting that the circuit protection device fails, and can be electrically connected to a remote system monitor so as to allow remote sensing of failure of the fuse 10.

The pull down clamp control signal 104 enables or disables a pull down clamp 110, which connects in parallel with the load 20. In normal operation, as shown in FIG. 3, the pull down clamp 110 remains disabled to allow a voltage difference between the output voltage 70 and the return 60 so as to power the load 20. When the fuse 10 blows and the pull down clamp control signal 104 is enabled, the pull down clamp 110 equalizes the output voltage 70 and the return voltage 60, such as by grounding both connections, thereby limiting the potential across the output voltage 70 and the return voltage 60 to less than 1VDC.

The indicator control signals 106 control an indicator, shown as a bi-color light emitting diode 108. The bi-color light emitting diode 108 displays a green light during normal operation of the system as shown in FIG. 3, but displays a red light indicating a blown fuse or other circuit interruption in the configuration shown in FIG. 4. In other embodiments, one or more single color light emitting diodes or other visual indicators are used to display one or both of the normal and interrupted states.

In one embodiment, the programmable circuit 102 is a microcontroller. The microcontroller is programmable in any of a number of programming languages, such as assembly language, C, or other low-level language. In alternate embodiments, the programmable circuit 102 is a programmable logic device (PLD) such as a field programmable gate array (FPGA), Complex Programmable Logic Device (CPLD), or Power ASIC (Application Specific Integrated Circuit). In these embodiments, a hardware description language such as Verilog, ABEL, or VHDL defines operation of the programmable circuit 102. In embodiments having multiple alarm circuits 100, each alarm circuit can be located on a separate logic device, or multiple alarm circuits can be programmed into the same logic device. In an embodiment in which the programmable circuit 102 is a microcontroller, multiple programmable circuits are implementable within a single microcontroller, if desired, by implementing a time-sharing scheduling system in which each programmable circuit operates at an effective frequency determined by the frequency of the microcontroller and the number of programmable circuits required.

Figure 1A:
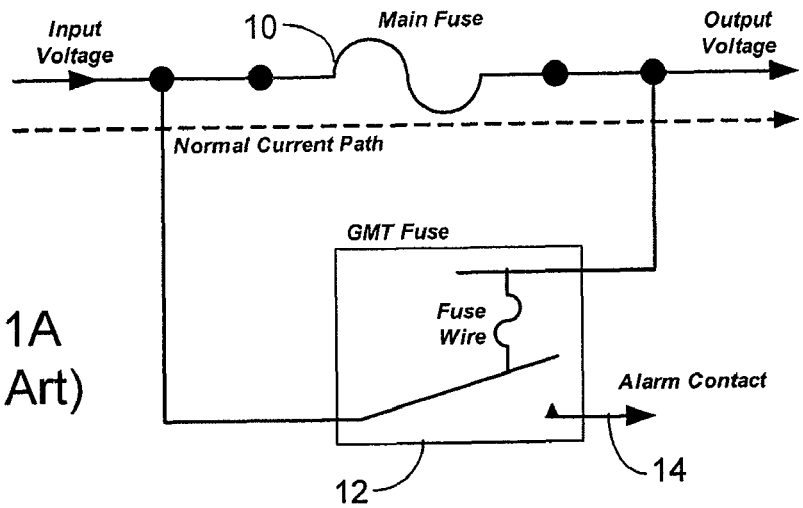
FIGS. 1A-1C represent a schematic diagram of a prior art fuse alarm circuit having a secondary fuse in normal and blown states.
Figure 1B:
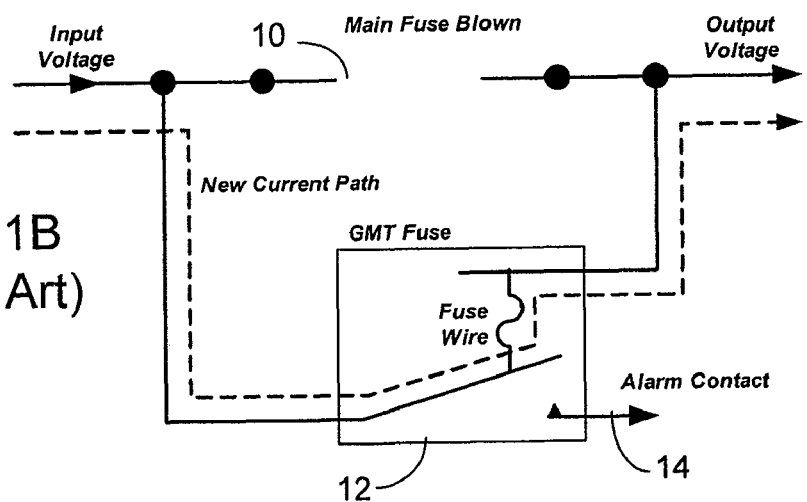
Figure 1C:
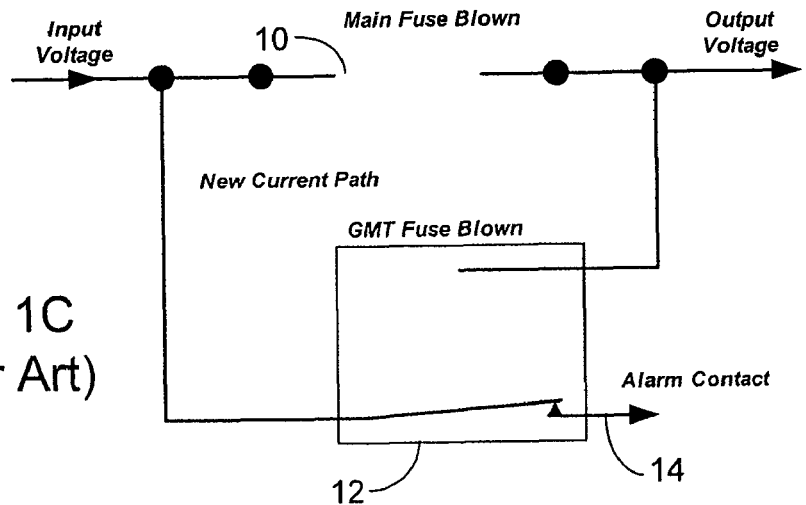
Figure 2A:
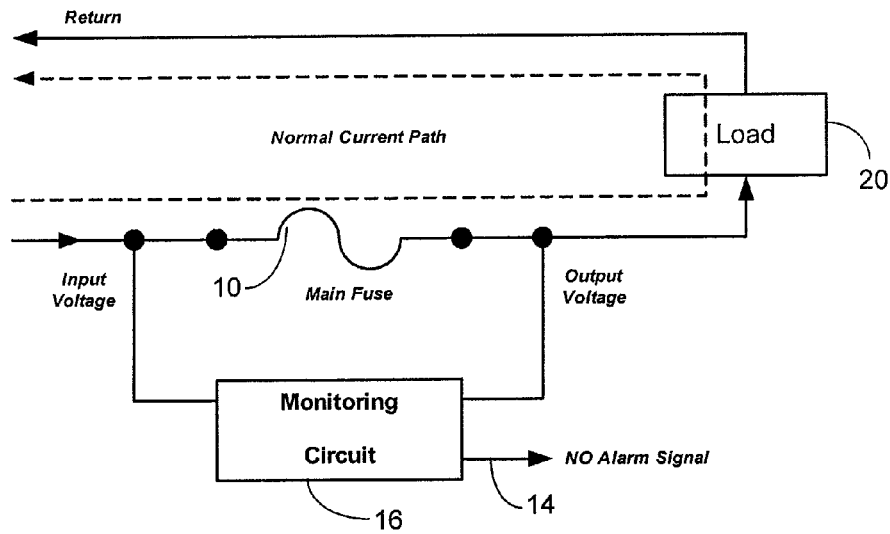
FIGS. 2A-2B represent a schematic diagram of a prior art fuse alarm circuit having a monitoring circuit in normal and blown states.
Figure 2B:
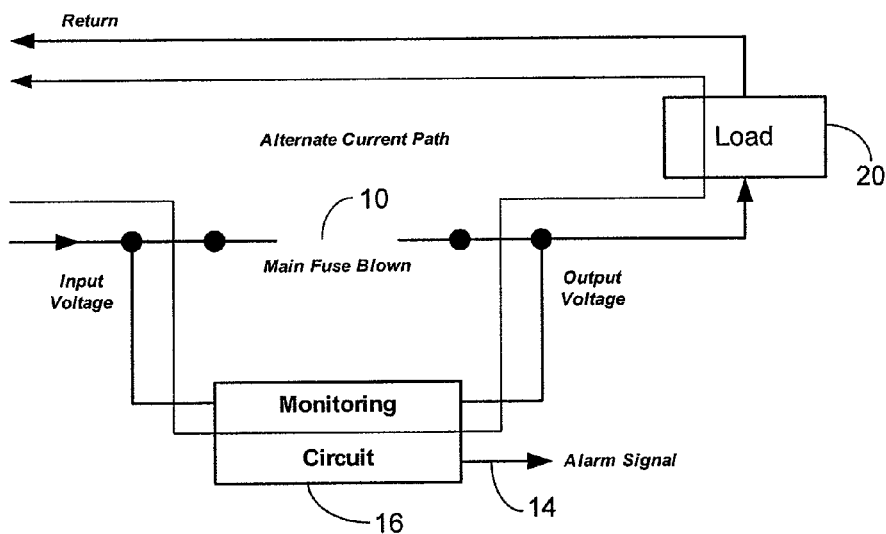
Figure 2C:
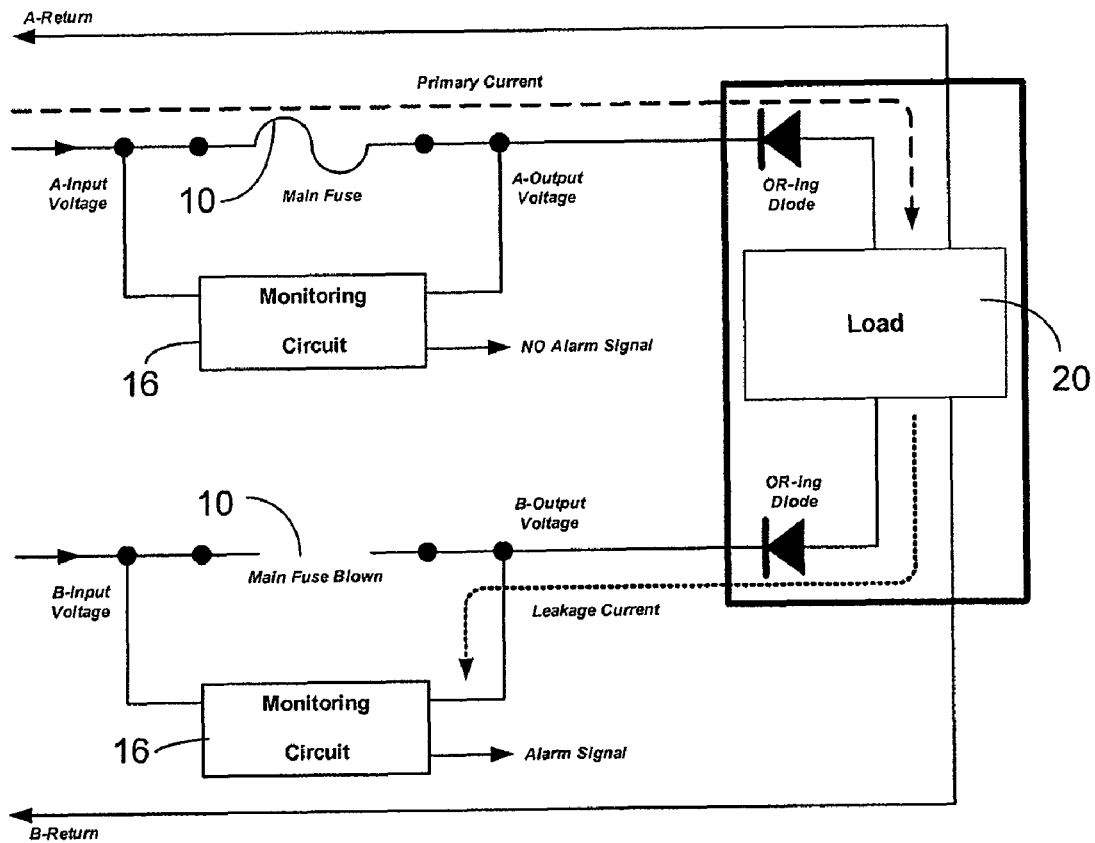
FIG. 2C represents a schematic diagram of a prior art fuse alarm circuit in which two fused power circuits are monitored by monitoring circuits.

Although in FIGS. 3-4 a generalized alarm circuit 100 is shown, the programmable circuit 102 and the methods and systems of the present disclosure can be implemented in a number of other circuits, such as in redundant power delivery circuit applications as shown, for example, in FIG. 2C above.

Figure 5:
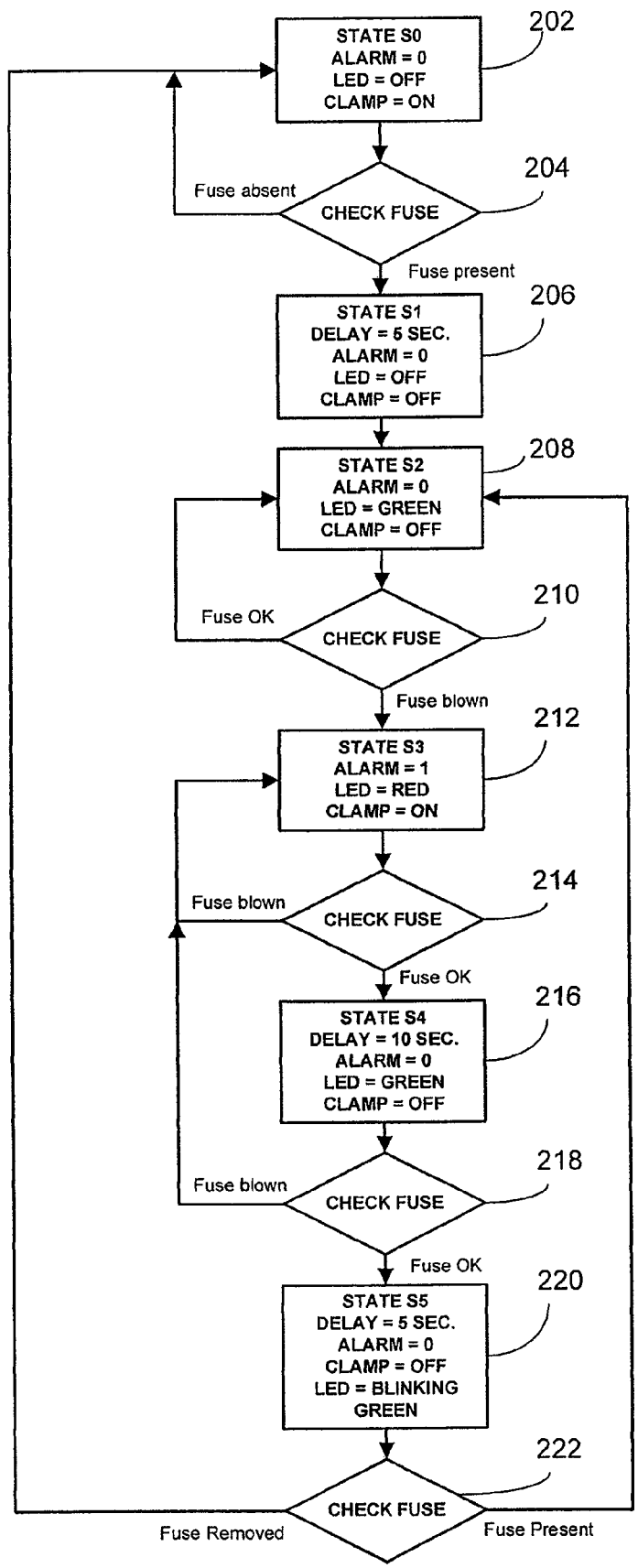
FIG. 5 is a finite state diagram of operation of a programmable circuit according to a possible embodiment of the present disclosure.

FIG. 5 illustrates a finite state machine 200 defining operation of the programmable circuit 102 of FIGS. 3-4 according to a possible embodiment of the present disclosure. The finite state machine 200 includes a plurality of states, at least some of which correspond to physical conditions of the alarm circuit 100, such as a blown fuse, normal operation, or other conditions. The finite state machine 200 operates in a "clocked" embodiment of the programmable circuit 102, i.e. a PLD having an enabled clock signal input. In this clocked embodiment, the finite state machine will periodically change states or determine if a state change should occur. The period can correspond to a clock cycle, or some division thereof. In one embodiment, the finite state machine 200 is programmed to change state each clock cycle. In a further embodiment, the finite state machine 200 is programmed to change state in a period which is defined by a plurality of clock cycles.

Each state includes a definition of the output signals which are represented by that state. In the exemplary embodiment shown in FIGS. 3-4, the alarm signal 14, the indicator control signal 106, and the pull down clamp control signal 104 control the aspects of the alarm circuit 100.

The finite state machine 200 is instantiated in a state S0 at 202. The state S0 corresponds to a startup state in which the fuse 10 may or may not be installed. In the startup state, the alarm signal 14 is deactivated, indicating that a blown fuse is not present. The pull down clamp control signal 104 is activated. The indicator control signals 106 deactivate the indicator, causing the LED to turn off.

Operational flow proceeds to a check fuse module 204. The check fuse module 204 determines whether a fuse 10 is present. If a fuse is present, operational flow proceeds to state S1 at 206. If a fuse 10 is not present, operational flow remains with state S0 at 202.

The state S1 at 206 corresponds to a startup phase after a fuse 10 has been detected in which the finite state machine 200 waits to test the fuse. This delay ensures that the comparator input to the programmable circuit 102 is stable and unaffected by electrical noise generated during fuse insertion (i.e. debounce control). The delay also ensures that the occurrence of a blown fuse shortly after fuse insertion is detected by the functional state machine 200. During state S1 at 206, the alarm signal 14 is deactivated, indicating that a blown fuse is not detected. The indicator control signals 106 remain deactivated, indicating that no fuse is yet detected. The pull down clamp control signal 104 is deactivated, allowing a voltage difference across the output voltage 70 and the return voltage 60.

The finite state machine 200 remains in state S1 for a predetermined length of time. In the embodiment shown, the finite state machine remains in state S1 for five seconds. In alternative embodiments, a longer or shorter time is implemented, provided that debounce control and quickly blown fuse conditions are detectable.

Operational flow proceeds to state S2 at 208. State S2 represents normal operation of the circuit as shown above in FIG. 3. In state S2, the alarm signal 14 is deactivated, indicating that a blown fuse is not present. The indicator control signals 106 cause a green light output from the bi-color light emitting diode 108 of FIGS. 3-4. Other indicator modes corresponding to a normally operational circuit state are possible as well. The pull down clamp control signal 104 is again deactivated.

Operational flow proceeds to a check fuse module 210. The check fuse module 210 determines whether the fuse 10 inserted into the alarm circuit has blown. If the fuse 10 has not blown, operational flow remains with state S2 at 208. If the fuse 10 has blown, operational flow proceeds to state S3 at 212.

State S3 at 212 corresponds to a blown fuse state of the alarm circuit, as shown above in FIG. 4. The alarm signal 14 activates, and is configured to indicate to a remote monitor of the alarm circuit that the fuse 10 has blown. The indicator control signals 106 drive a red light output from the bi-color light emitting diode 108 of FIGS. 3-4. Other indicator modes corresponding to an interrupted circuit state are possible as well. The pull down clamp control signal is activated, limiting the potential across the output voltage 70 and the return voltage 60 to less than 1 VDC.

Operational flow proceeds to a check fuse module 214. The check fuse module 214 determines whether the blown fuse is replaced by a technician or other user. If the fuse 10 has not been replaced, operational flow remains with state S3 at 212. If the fuse has been replaced, operational flow proceeds to state S4 at 216.

State S4 at 216 corresponds to a delay state following replacement of a blown fuse in the alarm circuit 100 shown above in FIGS. 3-4. This delay state ensures a stable comparator output analogously to operation of state S1. The delay also ensures that the occurrence of a blown fuse shortly after fuse insertion is detected by the functional state machine 200. In the embodiment shown, the delay occurs for ten seconds. However, a longer or shorter time that would still detect a faulty fuse could be implemented as well.

In state S4 at 216, the alarm signal 14 is deactivated, indicating that the blown fuse has been removed. The indicator control signals 106 are configured to generate a green light output from the bi-color light emitting diode 108 of FIGS. 3-4. Other indicator modes corresponding to an interrupted circuit state are possible as well. The pull down clamp control signal 104 is deactivated, allowing a voltage difference across the output voltage 70 and the return voltage 60.

Operational flow proceeds to a check fuse module 218. The check fuse module 218 determines whether the replacement fuse 10 inserted into the alarm circuit which caused the finite state machine 200 to switch from state S3 to state S4 blew shortly after insertion. If the replacement fuse 10 has blown, then operational flow returns to state S3 at 212. If the replacement fuse 10 has not blown, operational flow proceeds to state S5 at 220.

State S5 at 220 corresponds to a further delay state. This delay allows a technician or other individual replacing the fuse in the alarm circuit an opportunity to then remove the replacement fuse 10, causing the circuit to reset. State S5 therefore optionally can be used as a fuse test mechanism by a technician who wishes to determine whether a fuse is blown. In state S5, the indicator control signals are configured to generate a flashing green light output from the bi-color light emitting diode of FIGS. 3-4. This indicates to the technician that the finite state machine 200 can be reset by removing the fuse 10 inserted into the alarm circuit 100. The pull down clamp control signal 104 is deactivated. The alarm signal 14 is deactivated, indicating a blown fuse is not present.

Operational flow proceeds from state S5 to a check fuse state 222. The check fuse state 222 determines whether a fuse 10 is present. If a fuse is present, operational flow returns to state S2 at 208. If a fuse is not present, a technician or other user of the system has removed the fuse and operational flow returns to state S0 at 202.

Referring to FIG. 5 generally, multiple finite state machines can be programmed into a single programmable circuit 102, and can monitor multiple alarm circuits. Furthermore, a single finite state machine object can be implemented so as to monitor multiple alarm circuits 100, with each alarm circuit using a clock cycle in sequence to monitor the state of that alarm circuit 100. In such a configuration, the clock frequency is effectively divided by the number of circuits monitored by the finite state machine 200, and can be increased as appropriate so as to ensure accurate alarm operation and avoid state machine faults.

In additional alternate embodiments, indicators other than the bi-color light emitting diode of FIGS. 3-4 display the status of the alarm circuit 100. In such embodiments, appropriate indicator control signals are set to indicate normal operation, interrupted operation, or the absence of a circuit protection device altogether. For example, single color light emitting diodes, LCD displays, incandescent bulbs, or other visual indicators can be used.

In further embodiments, circuit breakers or other circuit protection modules are substitutable for the fuse 10 in the alarm circuit 100 with corresponding changes to the finite state machine 200 described above. For example, the check fuse modules 204, 210, 214, 218, and 222 can instead test for the presence or tripped state of circuit breakers used in place of the fuse 10 of FIGS. 3 and 4.

Figure 6:
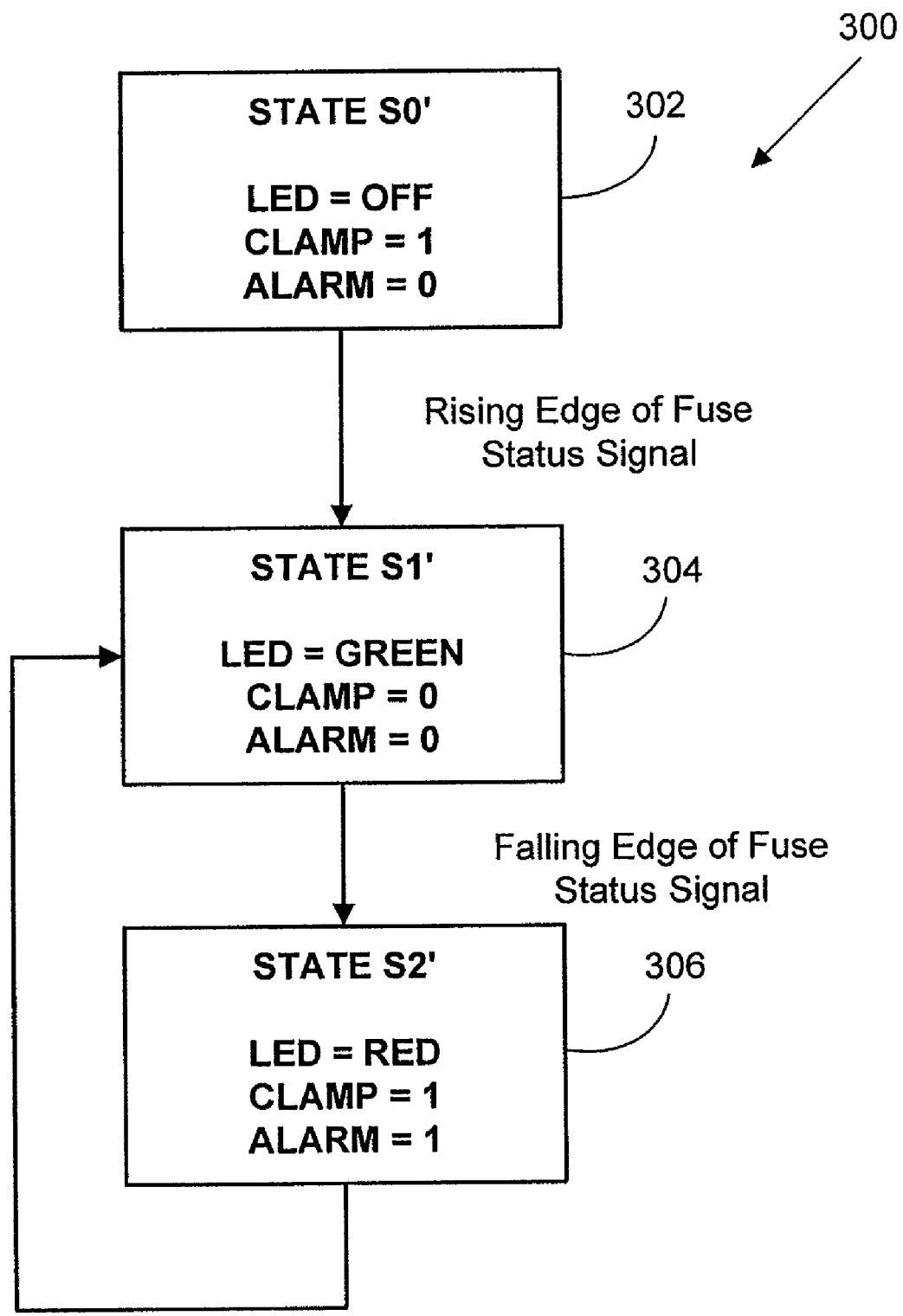
FIG. 6 is a finite state diagram of operation of a programmable circuit according to a further possible embodiment of the present disclosure.

FIG. 6 illustrates a finite state machine 300 defining operation of the programmable circuit 102 of FIGS. 3-4 according to a further possible embodiment of the present disclosure. The finite state machine 300 includes a plurality of states corresponding to physical conditions of the alarm circuit, such as a blown fuse, normal operation, or a reset condition. The finite state machine 300 operates in an "unclocked" embodiment of the programmable circuit 102, i.e. the programmable circuit is configured to change states based on input values, rather than clock signals and input values as is the case in the embodiment shown in FIG. 5.

Operational flow is instantiated at state S0' at 302. State S0' correlates to state S0 of FIG. 5 in that both states correspond to a startup state in which a fuse may or may not be installed. In state S0', the alarm signal 14 is deactivated, indicating that a blown fuse is not present. The pull down clamp control signal 104 is activated. The indicator control signals 106 deactivate the indicator, causing the LED to turn off. Operation of the finite state machine 300 remains in state S0' until a fuse is inserted into the alarm circuit.

Upon detection of a fuse based on the difference in voltages as determined by the comparator incorporated into the alarm circuit, operational flow proceeds to state S1' at 304. State S1' correlates to state S2 of FIG. 5, in that both states correspond to normal operation of the alarm circuit 100 as shown in FIG. 3. The alarm signal 14 is deactivated, and the indicator control signals 16 drive a green light output from the bi-color light emitting diode 108 of FIGS. 3-4. The pull down clamp control signal 104 is deactivated, allowing current to flow through the load 20. The finite state machine remains in state S1' at 304 until the comparator output indicates that the fuse 10 has blown.

Upon detection of a blown fuse based on the difference in voltages as determined by the comparator incorporated into the alarm circuit 100, operational flow proceeds to state S2' at 306. State S2' correlates to state S3 of FIG. 5, in that both states correspond to interrupted operation of the alarm circuit 100 as shown in FIG. 4. The alarm signal 14 activates, and is optionally configured to transmit an indication to a remote monitor of the alarm circuit that the fuse has blown. The indicator control signals 106 drive a red light output from the bi-color light emitting diode 108. The pull down clamp control signal 104 activates. The finite state machine 300 remains in state S2' until the comparator detects that the blown fuse has been replaced. Upon detection of a replaced fuse 10, operational flow returns to state S1'.

Referring back to FIGS. 5 and 6, additional or fewer states can be used in clocked or unclocked finite state machines to monitor the status of a circuit protection device such as a fuse or circuit breaker. Additional states may be added, as well as manual inputs, such as a reset button associated with either of the finite state machines which would return each to state S0 or S0', respectively. Furthermore, additional input or output signals can be incorporated to provide additional circuit protection or fault indication features to the alarm circuit.

Figure 7:
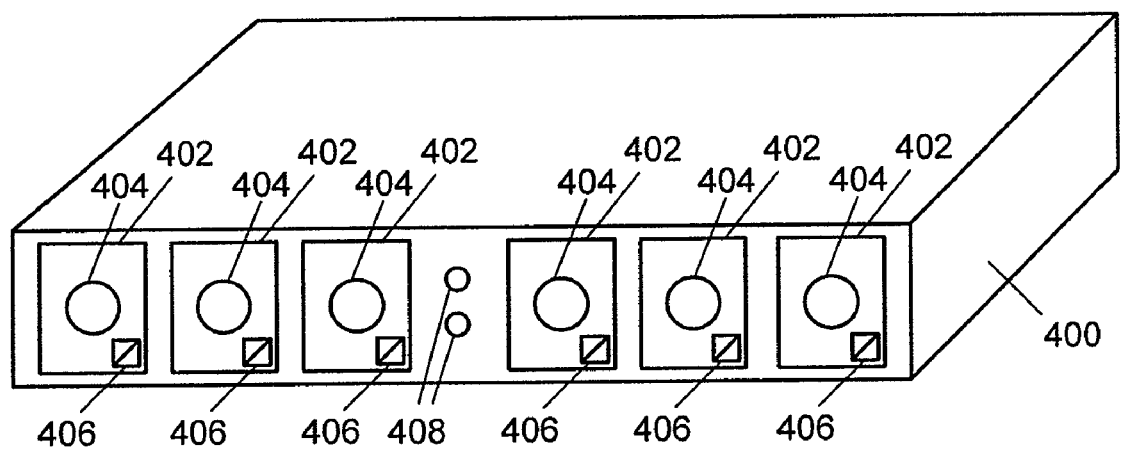
FIG. 7 is a perspective schematic view of a circuit panel according to a possible embodiment of the present disclosure.
Figure 8:
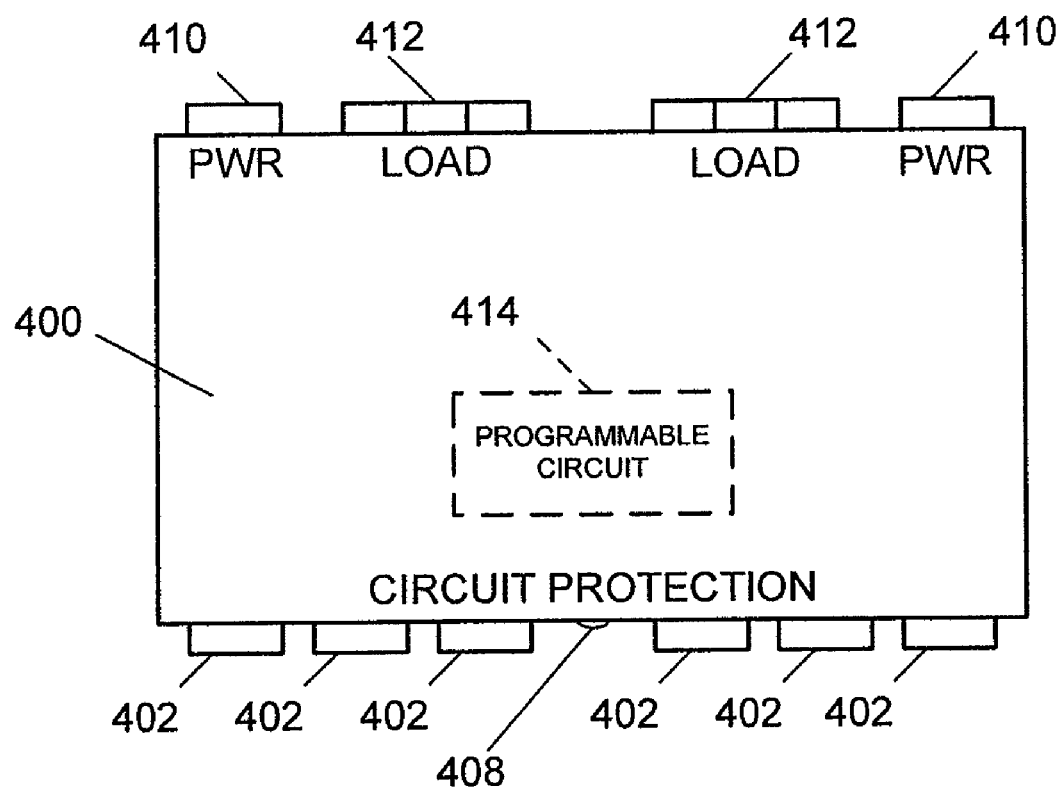
FIG. 8 is a top schematic view of the circuit panel of FIG. 7.

Referring now to FIGS. 7 and 8, an example circuit panel 400 incorporates the alarm circuit 100 described above in conjunction with FIGS. 3-4. The circuit panel 400 has a top panel, bottom panel, and side panels defining front and back ends. In the embodiment shown, the panel 400 is a power distribution panel, and the front end includes a plurality of circuit protection modules 402 and indicators 408. The back end of the panel 400 includes one or more power blocks 410 and load blocks 412.

The power blocks 410 include one or more voltage and return posts for connecting a direct current power source to the panel 400. The load blocks include one or more load and return voltage connections for connecting equipment requiring power from the direct current power source. Internal circuitry within the panel 400 connects a power block 410 to a load block 412 (or a portion thereof) through one or more circuit protection modules 402.

In the embodiment shown, each circuit protection module 402 includes a fuse 404 and an indicator 406. The fuse 404 can be any of a number of types of fuses, such as a GMT fuse, a TPM fuse, or any other suitable fuse. In an alternative embodiment, the circuit protection module 402 can include a plurality of fuses, circuit breakers, or a combination of the two.

The indicator 406 includes one or more light emitting diodes, and in the embodiment shown is a bi-color light emitting diode. Other indicators can be used as well, such as incandescent bulbs or LCD displays.

A programmable circuit 414 incorporated into the internal circuitry in the panel 400 connects in parallel to one or more of the circuit protection modules 402 as disclosed above in conjunction with FIGS. 3-4. The programmable circuit controls the indicator 404 on each module. The programmable circuit 414 includes one or more of the programmable circuits 102 of FIGS. 3-4, and may be implemented on one or more programmable logic devices or in one or more microcontrollers. Optionally, a programmable circuit can be incorporated onto each circuit protection module 402. An alarm output (not shown) optionally allows connection to a remote system for remote monitoring of the status of the circuit protection modules 402.

The indicators 408 on the front end of the circuit panel 400 illuminate when a voltage difference is applied to the power block 410 associated with the indicator 408. The indicators 408 therefore visually display when current is passing through the circuit protection modules 408 on the front face of the panel 400.

Various additional embodiments of circuit panels are possible as well. The programmable circuit 414 can be incorporated on a separate module, which can also include the indicators 404. The separate module would therefore monitor and display the status of the circuit protection devices on other modules present in the panel. In a further embodiment, the circuit protection devices are not located on modules, and are attached to the panel.

The various embodiments disclosed herein are useable in a direct current power distribution panel. Alarm circuits such as the alarm circuit 100 shown provide a compact current protection structure by which two or more current protection circuits can fit within a DC power distribution panel without interfering with additional electronics included in the system, such as voltage monitoring systems present in the panel.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An alarm circuit comprising:
   a circuit protection device connected in series at an input voltage of a load;
   a programmable circuit including a microcontroller connected in parallel to the circuit protection device and including an alarm signal, the microcontroller programmed to include a finite state machine comprising a plurality of functional states including one or more states representing conditions of the circuit protection device, the plurality of functional states including:
      a startup state;
      a normal circuit operation state; and
      an alarm activation state corresponding to a circuit interrupt condition in the circuit protection device.

2. The alarm circuit of claim 1, further comprising a pull down clamp having a control input electrically connected to the programmable circuit.

3. The alarm circuit of claim 2, wherein the pull down clamp is connected in parallel with the load.

4. The alarm circuit of claim 1, wherein the plurality of functional states includes a check fuse state.

5. The alarm circuit of claim 1, wherein the plurality of functional states includes a removed fuse state.

6. The alarm circuit of claim 1, wherein the plurality of functional states includes a delay state.

7. The alarm circuit of claim 6, wherein, during the delay state, the programmable circuit is configured to determine whether the circuit protection device is operational.

8. The alarm circuit of claim 1, wherein the circuit protection device is a circuit breaker.

9. The alarm circuit of claim 1, wherein the circuit protection device is a fuse.

10. The alarm circuit of claim 1, wherein the programmable circuit includes a plurality of functional state machines.

11. The alarm circuit of claim 1, wherein, during the alarm activation state, a pull-down clamp connected in parallel with the load is activated.

12. An alarm circuit comprising:
    a fuse connected in series at an input voltage of a load;
    a programmable circuit including a microcontroller connected in parallel to the fuse and including an alarm signal, the microcontroller programmed to include a finite state machine comprising a plurality of functional states including one or more states representing conditions of the circuit protection device, the plurality of functional states including:
       a removed fuse state operable upon detection of a missing fuse in the alarm circuit in series at the input voltage of the load;
       a delay state enterable from the removed fuse state;
       a normal circuit operation state enterable from the delay state; and
       a blown fuse state in which the alarm signal is activated, the blown fuse state enterable from the normal circuit operation state.

13. The alarm circuit of claim 12, further comprising a second delay state enterable from the blown fuse state.

14. The alarm circuit of claim 12, further comprising a pull down clamp having a control input electrically connected to the programmable circuit.

15. The alarm circuit of claim 14, wherein the pull down clamp is connected in parallel with the load.

16. The alarm circuit of claim 12, further comprising a clock signal applied to the programmable circuit.

17. The alarm circuit of claim 12, further comprising an indicator activated by the programmable circuit.

18. The alarm circuit of claim 17, wherein the indicator is capable of displaying a plurality of colors.

19. A method of monitoring a circuit comprising a programmable circuit including a microcontroller programmed to include a finite state machine comprising a plurality of functional states including one or more states representing conditions of the circuit protection device, the microcontroller connected in parallel to a fuse and including an alarm signal, the method comprising:
    determining the existence of a removed fuse state in a programmable circuit based on a first visual indicator controlled by the programmable circuit;
    inserting a fuse in series with a load at an input voltage;
    waiting through a delay state;
    detecting a blown fuse in the circuit based on activation of the alarm signal by a blown fuse state of the programmable circuit; and
    upon receiving a notification of a blown fuse by the alarm signal, replacing the fuse.

20. The method of claim 19, further comprising, after replacing the fuse, waiting through a second delay state.

21. The alarm circuit of claim 1, wherein the finite state machine defines a sequence of states for the plurality of functional states, and wherein a next state among the sequence of states depends at least in part upon a current state of the finite state machine.

22. The alarm circuit of claim 12, wherein the finite state machine defines a sequence of states for the plurality of functional states, and wherein a next state among the sequence of states depends at least in part upon a current state of the finite state machine.

* * * * *